United States Patent [19]

Miyauchi et al.

[11] 4,020,718
[45] May 3, 1977

[54] HYDRAULIC SYSTEM FOR AN AUTOMATIC POWER TRANSMISSION

[75] Inventors: Toshiyuki Miyauchi; Kunio Ohtsuka, both of Yokohama, Japan

[73] Assignee: Nissan Motor Co., Ltd., Yokohama, Japan

[22] Filed: Feb. 26, 1975

[21] Appl. No.: 553,324

Related U.S. Application Data

[63] Continuation of Ser. No. 332,400, Feb. 14, 1973, abandoned.

[30] Foreign Application Priority Data

Feb. 15, 1972 Japan .............................. 47-15917

[52] U.S. Cl. .................................. 74/869; 74/864
[51] Int. Cl.² ......................................... B60K 41/18
[58] Field of Search ............ 74/864, 865, 867, 868, 74/869, 877

[56] References Cited

UNITED STATES PATENTS

| | | | |
|---|---|---|---|
| 3,327,554 | 6/1967 | Searles | 74/869 |
| 3,438,285 | 4/1969 | Hanzi et al. | 74/869 |
| 3,561,296 | 2/1971 | Iijima | 74/869 |
| 3,641,845 | 2/1972 | Uozumi | 74/867 |
| 3,672,243 | 6/1972 | Murakami et al. | 74/867 X |
| 3,707,891 | 1/1973 | Asano et al. | 74/869 |
| 3,710,649 | 1/1973 | Kubo | 74/869 X |

Primary Examiner—Samuel Scott
Assistant Examiner—Lance W. Chandler

[57] ABSTRACT

A hydraulic system for an automatic power transmission of a motor vehicle and adapted for preventing creep of the motor vehicle when the vehicle comes to a complete halt. The hydraulic system includes a first shift valve responsive to throttle pressure and governor pressure to control supply of line pressure into servo means for actuating a friction element to provide lower gear reduction ratio, and a second shift valve responsive to released condition of an accelerator pedal of the vehicle for supplying line pressure into a governor pressure port of the first shift valve, whereby the first shift valve is moved in dependence on throttle pressure and line pressure into a position to supply line pressure into the servo means for thereby effecting shift into the lower gear reduction ratio in the power transmission. The hydraulic system may further include a third shift valve responsive to fully depressed condition of the accelerator pedal to supply line pressure into the first shift valve to apply line pressure thereto so that the shifting point is raised to a higher vehicle speed side during kickdown condition.

12 Claims, 5 Drawing Figures

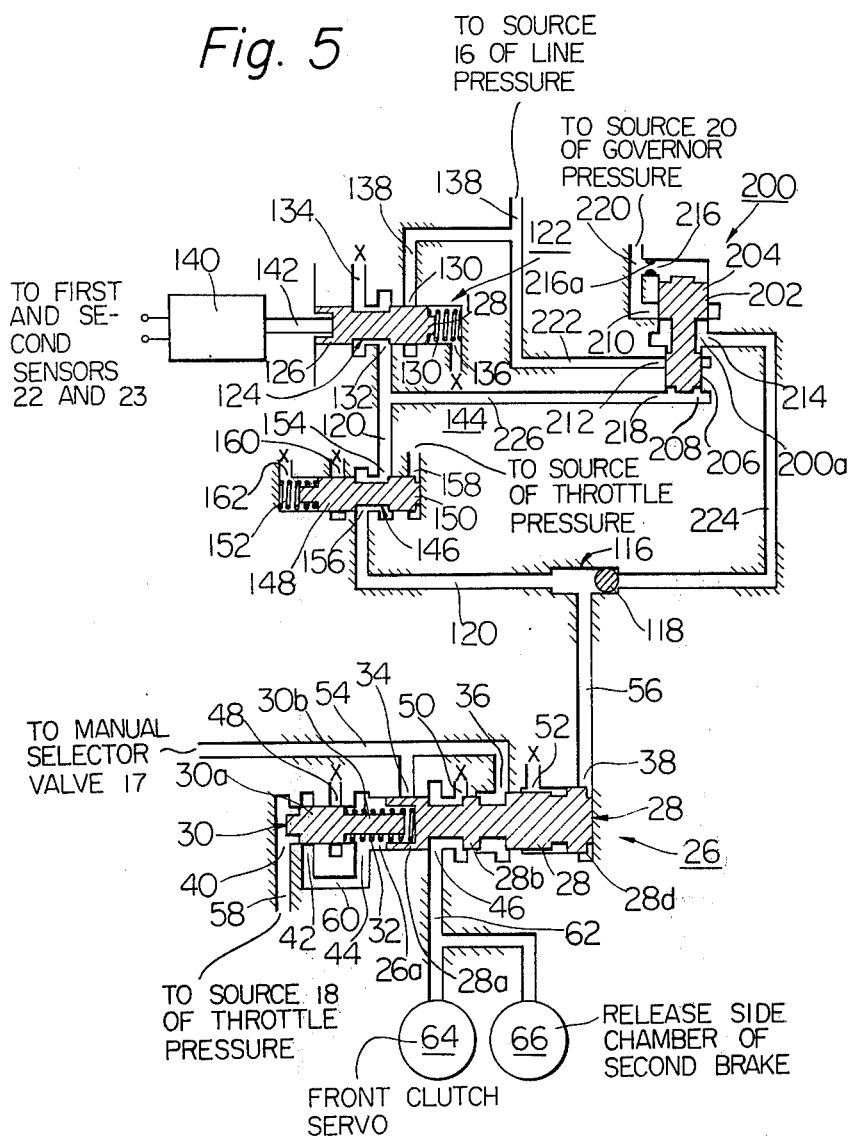

HYDRAULIC SYSTEM FOR AN AUTOMATIC POWER TRANSMISSION

This is a continuation of application Ser. No. 332,400, filed Feb. 14, 1973, now abandoned.

This invention relates in general to an automatic power transmission for a motor vehicle and, more particularly, to a system for preventing creep of the motor vehicle when the vehicle comes to a complete halt.

As is well known in the art, a conventional automatic power transmission employed in motor vehicles is so arranged as to shift into the highest gear reduction ratio, viz., into a first speed gear reduction ratio when the motor vehicle is at a standstill in the event that the automatic power transmission is set in its automatic drive range or "D" range. With this arrangement, an input torque delivered from a vehicle engine is transmitted to an output shaft of the power transmission at a high gear reduction ratio and, therefore, creep is caused to take place. It is thus required that a service brake pedal of the motor vehicle be depressed in order to maintain the motor vehicle completely immobile.

It is, therefore, an object of the present invention to provide a system for preventing creep of a motor vehicle when the vehicle comes to a complete halt without depressing a service brake pedal during this particular period.

Another object of the present invention is to provide a hydraulic system for use in an automatic power transmission of a motor vehicle, which system is adapted to prevent creep of the motor vehicle when the vehicle comes to a complete halt even in the event that the power transmission is in the D range.

Another object of the present invention is to provide a hydraulic system for use in an automatic power transmission of a motor vehicle, which system is adapted to cause the power transmission to shift into a straight drive when the motor vehicle is at a standstill even in the event that the power transmission is in the D range whereby creep of the motor vehicle is prevented during this particular period.

Still another object of the present invention is to provide a hydraulic system for use in an automatic power transmission, which system is adapted to cause the power transmission to shift into straight drive during idling of a vehicle engine, viz., when an accelerator pedal is released and to cause the power transmission to shift into the highest gear reduction ratio when the accelerator pedal is depressed to effect quick acceleration.

A further object of the present invention is to provide a hydraulic system for use in an automatic power transmission of a motor vehicle, which system is adapted to prevent creep of the motor vehicle when it is at a standstill in the event the power transmission is in the D range and to prevent upshift from a higher gear reduction ratio to a lower gear reduction ratio even when an accelerator pedal is released for thereby effecting engine braking during coasting downhill.

A further object of the present invention is to provide a hydraulic system for use in an automatic power transmission of a motor vehicle, which system is adapted to prevent creep of the motor vehicle when it is at a standstill even in the event the power transmission is in the D range and to effect kickdown when an accelerator pedal is depressed to a predetermined extent.

A still further object of the present invention is to provide a hydraulic system for use in an automatic power transmission of a motor vehicle, which system can be readily incorporated in a usual hydraulic control system of the power transmission.

A yet further object of the present invention is to provide a hydraulic system for use in an automatic power transmission of a motor vehicle which system requires a minimum number of component parts whereby the whole system is simple in construction and ready to assemble.

A yet further object of the present invention is to provide a hydraulic system for use in an automatic power transmission of a motor vehicle, which system is ready to manufacture and economical to produce.

These and other objects and advantages of the present invention will become more apparent from the following description when taken in conjunction with the accompanying drawings, in which:

FIG. 5 is a sectional view of a fourth preferred embodiment of the hydraulic circuit shown in FIG. 1.

The present invention will be herein described as applied to an automatic power transmission providing three forward gear reduction ratios, by way of example only. It should, however, be noted that the hydraulic system of the present invention can be applied to an automatic power transmission providing more than three forward gear reduction ratios or less than three forward gear reduction ratios.

Figure 1:
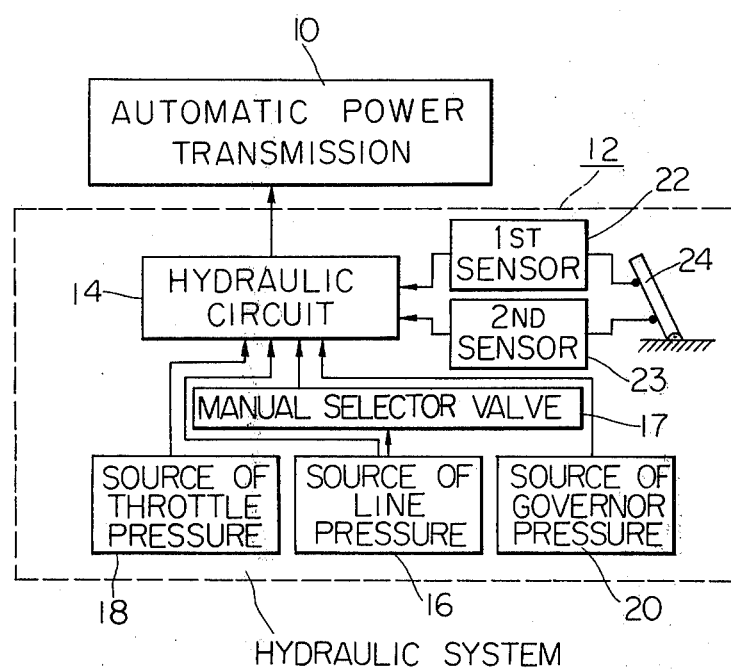
FIG. 1 is a schematic view illustrating a hydraulic system for use in a usual automatic power transmission of a motor vehicle according to the present invention.

Referring now to the drawings and more particularly, to FIG. 1, a hydraulic system embodying the present invention is schematically shown, which system is specifically suited for use in automatic power transmission of the type having a plurality of friction elements to effect shifts into desired gear reduction ratios. This type of an automatic power transmission is, for example, clearly disclosed in the U.S. Pat. No. 3,453,908 entitled "Hydraulic Control System for Automatic Transmission" and, therefore, a detail discussion of the same will be herein omitted for the sake of simplicity of description.

The automatic power transmission, which is designated by reference numeral 10, is shifted into the lowest gear reduction ratio or the third speed gear reduction ratio when the motor vehicle comes to a halt while the power transmission is set in the D range whereby creep of the motor vehicle is prevented. To this end, the friction element such as a front clutch of the power transmission is coupled, when the motor vehicle comes to a halt while the power transmission is set in the D range, by a hydraulic fluid pressure supplied from the hydraulic system according to the present invention. This hydraulic fluid pressure will be referred to as a line pressure hereinafter.

The hydraulic system, which is generally indicated by reference numeral 12, includes a hydraulic circuit 14 which communicates with a source 16 of line pressure, a source 18 of throttle pressure and a source 20 of governor pressure. The source of line pressure, the source of throttle pressure and the source of governor pressure are, for example, clearly disclosed in the U.S. Patent mentioned hereinabove. The source 16 of line pressure also communicates with the hydraulic circuit 14 through a manual selector valve 17, which passes the line pressure to the hydraulic circuit 14 when the manual selector valve 17 is set in the D range position. This manual selector valve is clearly disclosed in the U.S. Patent stated hereinabove. The source of throttle pressure is also clearly explained in the U.S. Pat. NO. 3,695,122 entitled "A Control System for an Automotive Automatic Power Transmission". As clearly stated in this U.S. patent, the throttle pressure increases as the intake manifold vacuum of a vehicle engine decreases or when an effective opening area of a carburetor throttle valve of the vehicle engine is increased. Thus, the throttle pressure increases as the degree of depression of an accelerator pedal increases because the effective opening area of the carburetor throttle valve is proportional to the degree of depression of the accelerator pedal. The position or the degree of depression of the accelerator pedal is thus utilized as one parameter in the hydraulic system 12 of the present invention for a reason as will be subsequently described. The governor pressure is produced by a governor valve rotatably mounted on an output shaft of the power transmission as disclosed in the U.S. Pat. No. 3,453,908 mentioned hereinabove. This governor pressure increases as the rotational speed of the transmission output shaft increases. The governor pressure and the throttle pressure are applied to shift valve means (not shown) to control the flow passage of the line pressure in dependent thereon as will be subsequently described. The hydraulic system 12 also includes a first sensor 22, which may be of any suitable construction such as a limit switch in so far as it functions to produce an electric signal when the accelerator pedal, indicated at 24, is released. The electric signal produced by the first sensor 22 is utilized for preventing creep of the motor vehicle. The hydraulic system 12 may further includes a second sensor 23 adapted to produce a kickdown signal when the accelerator pedal 24 is depressed to a predetermined extent, for example, to the degree of 80 percent. The kickdown signal produced by the second sensor 23 is utilized for effecting kickdown in the automatic power transmission 10. The second sensor 23 may be a limit switch.

Figure 2:
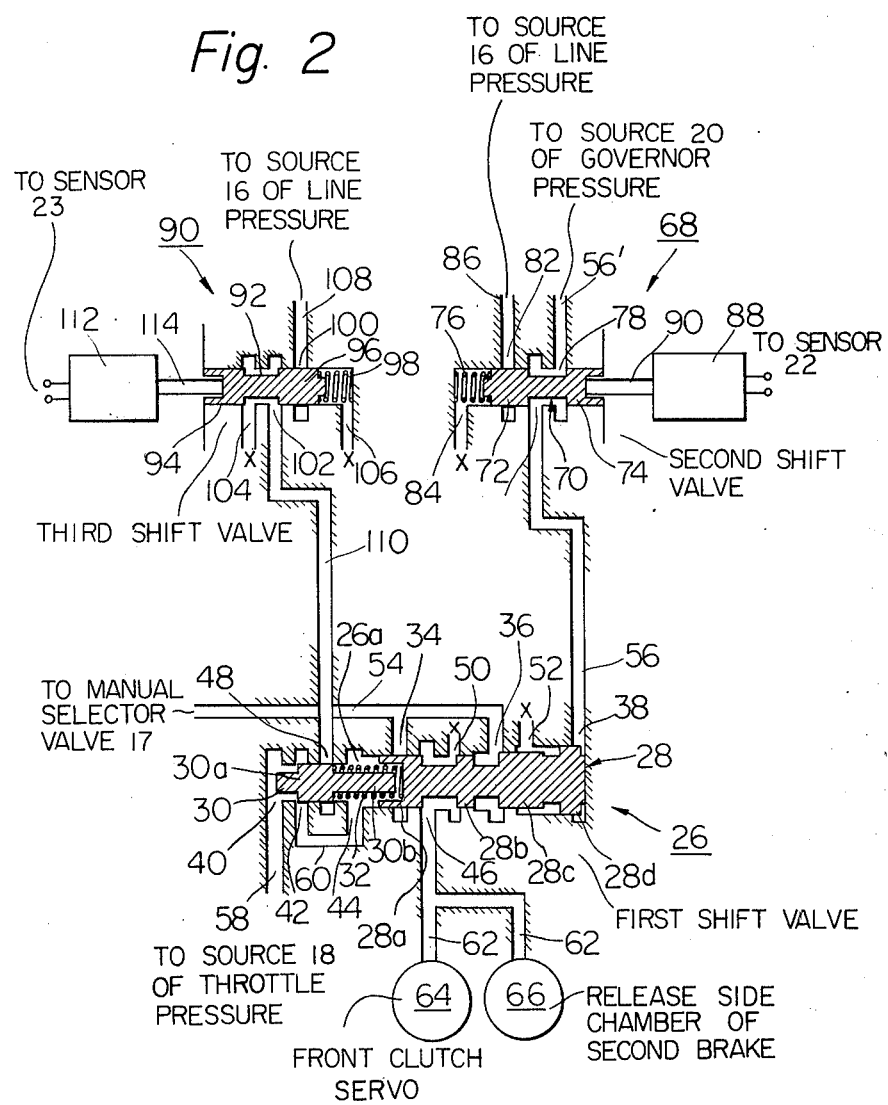
FIG. 2 is a sectional view of a first preferred embodiment of the hydraulic circuit shown in FIG. 1.

FIG. 2 illustrates a first preferred embodiment of the hydraulic circuit of the hydraulic system shown in FIG. 1. As shown, the hydraulic circuit 14 comprises a first shift valve 26 having a primary valve spool 28 and a secondary valve spool 30 cooperating with each other. The primary valve spool 28 has a plurality of spaced valve lands 28a, 28b, 28c and 28d, while the secondary valve spool 30 has a valve land 50a and a projection 30b selectively acting on the valve land 28a of the primary valve spool 28. The first shift valve 26 also has a compression spring 32, which is disposed in a fluid chamber 26a between the valve land 28a of the primary valve spool 28 and the valve land 30a of the secondary valve spool 30 to biase the primary valve spool 28 rightwardly of the drawing. The first shift valve 26 also has a plurality of ports 34, 36, 38, 40, 42, 44, 46, 48, 50 and 52. The port 34 communicates with a conduit 54, with which the port 36 also communicates. This port 34 will be hereinafter referred to as an inlet port. The conduit 54 communicates with the manual selector valve 17 which in turn communicates with the source 16 of line pressure (see FIG. 1) and receives a line pressure therefrom when the manual selector valve 17 is set in the D range position. The port 38 communicates with conduits 56 and 56' communicating with the source 20 of governor pressure and receives a governor pressure therefrom. This port 38 will be hereinafter referred to as a governor pressure port. The rightward end of the valve land 28d of the primary valve spool 28 is exposed to the governor pressure delivered to the port 38 so that the primary valve spool 28 is biased leftwardly of the drawing against the action of the spring 32. The port 40 communicates with a conduit 58, which in turn communicate with the source 18 of throttle pressure. This port 40 will be hereinafter referred to as a throttle pressure port. The leftward end of the valve land 30a of the secondary valve spool 30 is exposed to the throttle pressure in the throttle pressure port 40 so that the secondary valve spool 30 is moved rightwardly thereby moving the primary valve spool 28 in the same direction. The port 42 communicates through a by-pass conduit 60 with the port 44 communicating with the fluid chamber 26a defined between the valve land 30a of the secondary valve spool 30 and the valve land 28a of the primary valve spool 28. This port 42 is restricted by the circumferential edge of the valve land 30a of the secondary valve spool 30 and communicates with the port 40 so that a reduced throttle pressure is supplied to the port 42. The reduced throttle pressure thus admitted to the port 42 is then allowed into the fluid chamber 26a via the conduit 60 and acts on the valve land 28a of the primary valve spool 28 thereby biasing the valve spool 28 rightwardly of the drawing. The port 46 selectively brought into fluid communication with the inlet port 34 by the action of the valve land 28a of the primary valve spool 28 to receive the line pressure therefrom. This port 46 will be hereinafter referred to as an outlet port. The outlet port 46 is shown as communicating through conduits 62 with a front clutch servo 64 and a release side chamber 66 of a second brake of the power transmission, respectively. With this arrangement, if the line pressure is admitted to the outlet port 46, the line pressure is passed into the release side chamber 66 of the second brake and into the front clutch servo 64 and, thus, the second brake is disengaged whereas the front clutch is engaged to provide the lowest gear reduction ratio or the direct drive. The port 48 is supplied with a line pressure for a reason as will be subsequently described. The ports 50 and 52 are drains through which excess of fluid under pressure is drained off.

With the construction mentioned hereinabove, the governor pressure is supplied to the governor pressure port 38 and acts on the valve land 28d of the primary valve spool 28, whereas the throttle pressure is supplied to the throttle pressure port 40 and acts on the valve land 30a of the secondary valve spool 30. The line pressure is supplied into the inlet port 34 through the conduit 54 only when the manual selector valve (not shown) is set in the D range position. Under these circumstances, if the vehicle speed is at low level, then the force acting on the valve land 28d of the primary valve spool 28 developed by the governor pressure acting thereon yields the sum of opposing force developed by the throttle pressure acting on the valve land 30a of the secondary valve spool 30 biasing the primary valve spool 28, the force developed by the reduced throttle pressure acting on the valve land 28a of the primary valve spool 28, and the force of the spring 32.

Consequently, the primary valve spool 28 is moved rightwardly of the drawing, viz., to the position shown in FIG. 2 thereby interrupting fluid communication between the inlet and outlet ports 34 and 46. Thus, the line pressure is prevented from being supplied into the outlet port 46 and, accordingly, the automatic power transmission shown in FIG. 1 is prevented from being shifted into the lowest gear reduction ratio or the direct drive.

If, however, the vehicle speed increases beyond a predetermined level, then the force acting on the valve spool 28 developed by the governor pressure acting thereon overcomes the opposing forces acting on the valve land 28a of the primary valve spool 28. In this condition, the primary valve spool 28 is moved leftwardly of the drawing against the actions of the compression spring 32 and the secondary valve spool 30 thereby providing fluid communication between the inlet and outlet ports 34 and 46. Consequently, the line pressure in the inlet port 34 is admitted to the outlet port 46, through which the line pressure is delivered to the release side chamber 66 of the second brake (not shown) and the front clutch servo 64 via the conduits 62, respectively. Thus, the front clutch is engaged and the automatic power transmission shown in FIg. 1 is shifted into the third speed gear reduction ratio or the direct drive.

According to an important feature of the present invention, a line pressure, which is higher than the governor pressure, is supplied into the governor pressure port 38 of the first shift valve 26 when the motor vehicle comes to a complete halt so that the primary valve spool 28 is moved in a direction to provide fluid communication between the inlet and outlet ports 34 and 46 to effect engagement of the front clutch (not shown) whereby the power transmission is shifted into the direct drive ratio and, thus, creep of the motor vehicle is avoided. To this end, the hydraulic circuit 14 further comprises a second shift valve 68 which is interposed in the conduits 56 and 56' communicating with the governor pressure port 38 of the first shift valve 26.

The second shift valve 68 comprises a slidable valve spool 70 formed with spaced valve lands 72 and 74, and a compression spring 76 for biasing the valve spool 70 rightwardly of the drawing, viz., in a direction to open the conduit 56 thereby to supply the governor pressure into the governor pressure port 38 of the first shift valve 26. The second shift valve 68 has a plurality of ports 78, 80, 82 and 84. The port 78 communicates with a conduit 56' communicating with the source of governor pressure (not shown), while the port 80 communicates with the conduit 56 leading to the governor pressure port 38 of the first shift valve 26. The fluid communication between the ports 78 and 80 is controlled by the valve land 74 of the valve spool 70. As previously mentioned, the valve spool 70 is normally held in a position shown in FIG. 2 by the action of the compression spring 76 so that the ports 78 and 80 communicates with each other. The port 82 communicates with a conduit 86, which in turn communicates with the source 16 of line pressure (see FIG. 1) to receive a line pressure therefrom. This port 82 is normally closed by the valve land 72 of the valve spool 70, whereas, when the valve spool is moved leftwardly of the drawing against the action of the compression spring 76, the port 82 is brought into fluid communication with the port 80 so that the line pressure is supplied into the governor pressure port 38 of the first shift valve 26 through the conduit 56. The port 84 is a drain through which excess of fluid is drained off. As shown, the second shift valve 68 further comprises an electric actuating device 88 having a movable plunger 90 engaging with the valve land 74 of the valve spool 70. This electric actuating device 88 may be of any known construction such as a solenoid and is electrically connected to the first sensor 22 (see FIG. 1) adapted to sense the position of the accelerator pedal 24 (see FIG. 1). Thus, the actuating device 88 is energized to cause The plunger to protrude thereby moving the valve spool 74 leftwardly against the action of the compression spring 76 in response to the electric signal delivered from the first sensor 22.

Before discussing the operation of the second shift valve 68 and the first shift valve 26, let it be assumed that the manual selector valve is set in the D range position and the line pressure is supplied into the inlet port 34 of the first shift valve 26. If, in this instance, the accelerator pedal 24 (see FIG. 1) is depressed, then the first sensor 22 (see FIG. 1) does not produce an electric signal to be supplied to the actuating device 88. Consequently, the actuating device 88 is deenergized so that the plunger 90 is retracted as shown in FIG. 2. Under this circumstance, the valve spool 70 is moved to a position to provide fluid communication between the ports 78 and 80 while interrupting fluid communication between the ports 82 and 80. The governor pressure is thus admitted to the governor pressure port 38 of the first shift valve 26. Accordingly, the primary valve spool 28 of the first shift valve 26 operates in a manner as already stated hereinabove and the position of the valve spool 28 is determined by the levels of the governor pressure and the throttle pressure. If, however, the accelerator pedal 24 (see FIG. 1) is released to cause the motor vehicle to come to a halt, then the first sensor 22 (see FIG. 1) produces electric signal which is supplied to the actuating device 88 of the second shift valve 68. Upon receiving this electric signal, the actuating device 88 is energized so that the plunger 90 is caused to protrude thereby moving the valve spool 70 against the action of the compression spring 76 to a position to provide fluid communication between the ports 82 and 80 and to interrupt fluid communication between the ports 78 and 80. Therefore, the line pressure in the port 82 is admitted to the port 80, through which the line pressure is allowed into the governor pressure port 38 of the first shift valve 26 via the conduit 56. The line pressure thus admitted to the governor pressure port 38 acts on the valve land 28d of the primary valve spool 28 and, thus, the position of the primary valve spool 28 is determined by the level of the line pressure and the throttle pressure acting thereon in opposite directions. Since, in this condition, the force acting on the primary valve spool 28 developed by the line pressure admitted to the governor pressure port 38 overcomes the opposing forces of the compression spring 32 and secondary valve spool 30 biased by the throttle pressure in the throttle pressure port 40, the primary valve spool 28 is moved to a position to provide fluid communication between the inlet and outlet ports 34 and 46. Consequently, the line pressure in the inlet port 34 is supplied into the front clutch servo 64 thereby effecting engagement of the front clutch (not shown) and into the release side chamber 66 of the second brake (not shown) to effect disengagement of the second brake. Thus, the automatic power transmission shown in FIG. 1 is shifted into the lowest gear reduction ratio or the direct drive and, thus, creep of the motor vehicle is satisfactorily prevented when the motor vehicle is at a standstill.

The hydraulic circuit shown in FIg. 2 may further comprise third shift valve 90 which is adapted to supply the line pressure to the port 48 of the first shift valve 26 for effecting kickdown when the accelerator pedal is fully depressed for quick acceleration. The third shift valve 90 comprises a slidable valve spool 92 having formed thereon spaced valve lands 94 and 96, and a compression spring 98 for biasing the valve spool 92 leftwardly of the drawing.

The third shift valve 90 has a plurality of ports 100, 102, 104 and 106. The port 100 communicates with a conduit 108 communicating with the source 16 of line pressure (see FIG. 1) and receives a line pressure therefrom. The port 102 communicates with a conduit 110, which in turn communicates with the port 48 of the first shift valve 26. The ports 104 and 106 are drains through which the excess of fluid is drained off.

Normally, the valve spool 92 is held in a position shown in FIG. 2, viz., in a position to interrupt fluid communication between the ports 100 and 102 by the action of the compression spring 98 so that the line pressure is prevented from being supplied into the port 48 of the first shift valve 26.

As shown, the third shift valve 90 further comprises an actuating device 112 having a movable plunger 114 engaging with the valve land 94 of the valve spool 92. This actuating device 112 may be of any known construction such as a solenoid which is electrically connected to the second sensor 22 (see FIG. 1).

As previously noted, the second sensor 22 produces a kickdown signal when the accelerator pedal is depressed to a predetermined extent, for example, to the degree of 80 percent for quick acceleration. Thus, when the kickdown signal is supplied to the actuating device 112, the actuating device 112 is energized so that the plunger 114 is caused to protrude thereby moving the valve spool 92 to a position to provide fluid communication between the ports 100 and 102 against the action of the compression spring 98. In this condition, the line pressure in the port 100 is admitted to the port 102, through which the line pressure is passed to the port 48 of the first shift valve 26 via the conduit 110. The port 48 of the first shift valve 26 is normally opened by the valve land 30a of the secondary valve spool 30 as shown in FIG. 2 so that the line pressure admitted to the port 48 of the first shift valve 26 is allowed into the fluid chamber 26a defined between the valve land 28a of the primary valve spool 28 and the valve land 30a of the secondary valve spool 30. The line pressure thus admitted to the fluid chamber 26a acts on the valve land 28a of the primary valve spool 28 thereby biasing the primary valve spool 28 in a direction to interrupt fluid communication between the inlet and outlet ports 34 and 46 of the first shift valve 26. Since, in this condition, the force acting on the valve land 28a of the primary valve spool 28 is increased because the line pressure acting on the valve land 28a of the primary valve spool 28 is higher than the reduced throttle pressure acting thereon, the primary valve spool 28 is moved leftwardly of the drawing when the force acting on the valve land 28d of the primary valve spool 28 is increased, viz., when the governor pressure acting on the primary valve spool 28 is increased. Thus, upshifting from a higher gear reduction ratio to a lower gear reduction ratio is effected in the automatic power transmission at a higher vehicle speed side during kickdown.

Figure 3:
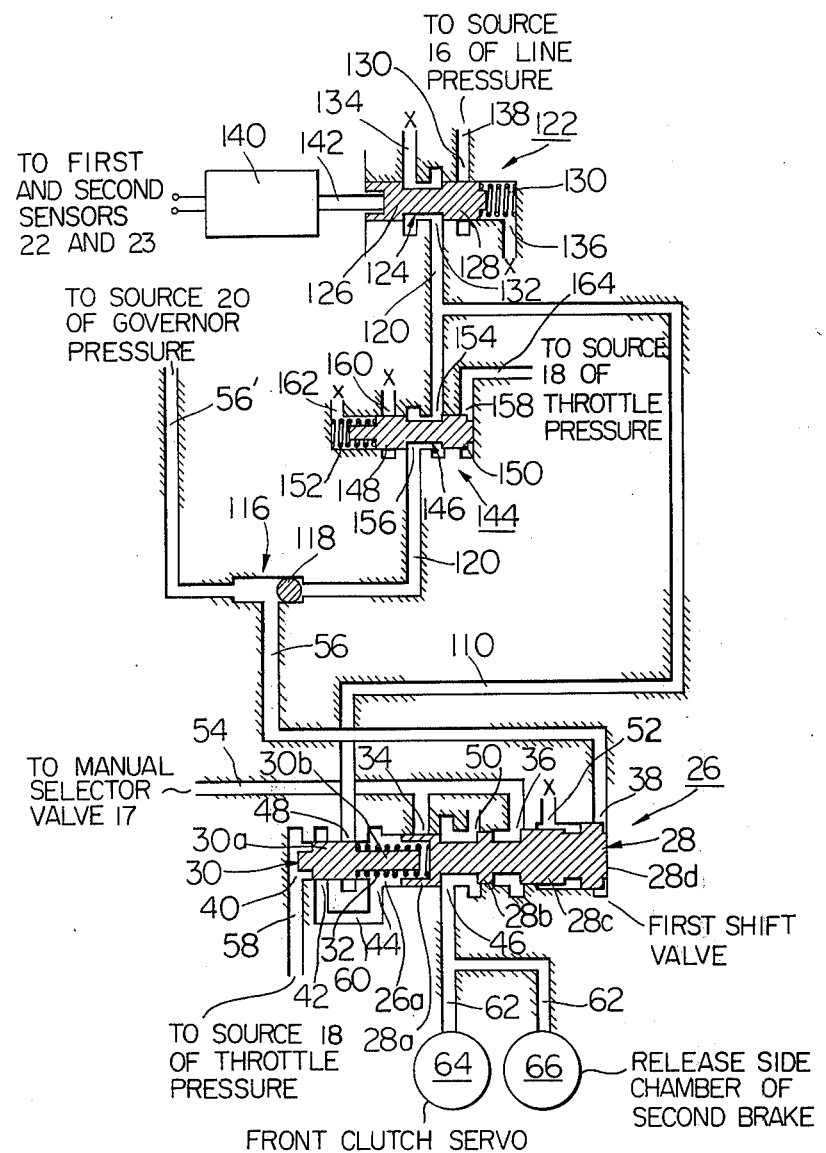
FIG. 3 is a sectional view of a second preferred embodiment of the hydraulic circuit shown in FIG. 1.

A second preferred embodiment of the hydraulic circuit forming part of the hydraulic system according to the present invention is illustrated in FIG. 3 wherein corresponding component parts are designated by the same reference numerals as those used in FIG. 2. In the illustrated embodiment of FIG. 3, a check valve 116 is interposed between the conduits 56 and 56' to selectively supply the governor pressure and the line pressure into the governor port 38 of the first shift valve 26. The check valve 116 has a check ball 118, which is normally positioned to provide fluid communication between the conduits 56 and 56' to permit the governor pressure in the conduit 56' to pass into the conduit 56. The check ball 118 of the check valve 116 is moved to a position to interrupt fluid communication between the conduits 56 and 56' when the line pressure is admitted to a conduit 120 leading to the check valve 116.

The conduit 120 communicates with a second shift valve 122 which controls the line pressure to be delivered to the conduit 120. The second shift valve 122 comprises a slidable valve spool 124 formed with spaced valve lands 126 and 128, and a compression spring 130 for biasing the valve spool 124 leftwardly of the drawing, vis., toward a position to prevent supply of the line pressure to the conduit 120. Thus, when the valve spool 124 of the second shift valve 122 assumes the position shown in FIG. 3, the check ball 118 of the check valve 116 is located in a position to permit the governor pressure to pass into the governor pressure port 38 of the first shift valve 26.

The second shift valve 122 has a plurality of ports 130, 132, 134 and 136. The port 130 communicates with a conduit 138 communicating with the source 16 of line pressure (see FIG. 1) to receive the line pressure therefrom. The port 132 communicates with the conduit 120 leading to the check valve 116. This port 132 is selectively brought into fluid communication with the port 130 by the valve land 128 of the valve spool 124. The port 134 is a drain, which is normally in fluid communication with the port 132 because the valve spool 124 is maintained in such a position by the action of the compression spring 130 so that the line pressure in the conduit 120 is drained off. The port 136 is a drain through which excess of fluid is drained off.

The second shift valve 122 also comprises an electric actuating device 140 having a movable plunger 142 engaging with the valve land 126 of the valve spool 124. This electric actuating device 140 may be of any known construction such as a solenoid. The actuating device is electrically connected to the first and second sensors 22 and 23 so that the actuating device is energized both when the accelerator pedal is released and when the accelerator pedal is depressed to a predetermined extent, such as for example, to the degree of 80 percent.

A third shift valve 144 is located in the conduit 120 to selectively supply the line pressure to the port 48 of the first shift valve 26 for thereby effecting kickdown in the power transmission. The third shift valve comprises a slidable valve spool 146 having spaced valve lands 148 and 150, and a compression spring 152 for biasing the valve spool 146 rightwardly of the drawing, viz., toward a position to open the conduit 120. The third shift valve 144 has a plurality of ports 154, 156, 158, 160 and 162. The port 154 communicates through the conduit 120 with the port 132 of the second shift valve.

The port 156 communicates through the conduit 120 with the check valve 116. The port 158 communicates through a conduit 164 with the source 18 of throttle pressure (see FIG. 1) to receive the throttle pressure therefrom. The valve land 150 of the valve spool 146 is thus exposed to the throttle pressure in the port 158 so that, when the throttle pressure reaches a predetermined level which corresponds to the predetermined depression of the accelerator pedal, the valve spool 146 is moved against the action of the compression spring 152 toward a position to close the port 154.

In the illustrated embodiment of FIG. 3, the conduit 110 communicating with the port 48 of the first shift valve 26 is hydraulically connected to the conduit 120 between the second and third shift valves 122 and 144 so that the line pressure is selectively admitted to the port 48 of the first shift valve 26 for a reason to be described in detail.

During normal driving condition of the motor vehicle, the actuating device 140 of the second shift valve is de-energized so that the movable plunger 142 is retracted. In this condition, the valve spool 124 of the second shift valve 122 is maintained in a position to interrupt fluid communication between the ports 130 and 132 while providing fluid communication between the ports 132 and 134 by the action of the compression spring 130 as shown in FIG. 3. On the other hand, the force acting on the valve land 150 of the valve spool 146 of the third shift valve 144 developed by the throttle pressure in the port 158 yields the opposing force of the compression spring 152 and, accordingly, the valve spool 146 is held in a position shown in FIG. 3, viz., in a position to provide fluid communication between the ports 154 and 156. Thus, the line pressure remaining in the conduit 120 is drained off through the port 134 of the second shift valve 122. Moreover, the conduit 110 is in fluid communication through the conduit 120 with the port 134 of the second shift valve 122. Under these circumstances, the check ball 118 of the check valve 116 is moved to a position to provide fluid communication between the conduits 56 and 56' by the governor pressure acting on the check ball 118. Consequently, the governor pressure is supplied into the governor pressure port 38 of the first shift valve 26 and acts on the valve land 28d of the valve spool 28. Thus, the position of the valve spool 28 is determined in dependent on the governor pressure and the throttle pressure so that shifting will take place from one gear reduction ratio to another in accordance with these factors.

If the accelerator pedal is fully depressed for quick acceleration, the kickdown signal is supplied to the actuating device 140 of the second shift valve 122. Upon receiving this kickdown signal, the actuating device 140 is energized so that the plunger 142 is caused to protrude thereby moving the valve spool 124 to a position to provide fluid communication between the ports 130 and 132. Thus, the line pressure in the conduit 138 is admitted to the conduit 120. Since, on the other hand, the throttle pressure delivered to the port 158 of the third shift valve is at high level when the accelerator pedal is fully depressed because the carburetor throttle valve of the vehicle engine is fully opened and the intake manifold vacuum is at low level, the force acting on the valve land 150 of the valve spool 146 developed by the throttle pressure acting thereon overcomes the opposing force of the compression spring 152. Consequently, the valve spool 146 is moved to a position to interrupt fluid communication between the ports 154 and 156. With the valve spool 146 being held in this position, the port 156 is brought into fluid communication with the port 160 and, thus, the line pressure remaining in the conduit 120 is drained off from the drain port 160. Under these circumstances, the line pressure admitted to the conduit 120 between the second and third shift valves 122 and 144 is delivered through the conduit 110 to the port 48 of the first shift valve 26. The line pressure thus admitted to the port 48 is supplied into the fluid chamber 26a and acts on the primary valve spool 28 thereby biasing the primary valve spool 28 with the force of the compression spring 32 and the force developed by the throttle pressure acting on the secondary valve spool 30. Thus, a kickdown is effected in the power transmission in a manner as previously mentioned.

During idling of the vehicle engine, viz., when the accelerator pedal is released, the actuating device 140 of the second shift valve 122 is energized so that the valve spool 124 of the second shift valve 122 is moved to a position to provide fluid communication between the ports 130 and 132 as already described hereinabove. Since, in this instance, the throttle pressure delivered to the port 158 of the third shift valve 144 is at low level because the intake manifold vacuum is high when the accelerator pedal is released, the force acting on the valve land 150 of the valve spool 146 developed by the throttle pressure in the port 158 yields the opposing force of the compression spring 152. Consequently, the valve spool 146 is moved to a position shown in FIG. 3, viz., to a portion to provide fluid communication between the ports 154 and 156 and, thus, the line pressure is admitted to the conduit 120 between the third shift valve 144 and the check valve 116. The line pressure admitted to this conduit 120 acts on the check ball 118, so that the check ball 118 is moved to a position to interrupt fluid communication between the conduits 56 and 56' while providing fluid communication between the conduits 120 and 56. The line pressure is thus admitted to the governor pressure port 38 of the first shift valve 26 and, therefore, the primary valve spool is moved to a position to provide fluid communication between the inlet and outlet ports 34 and 46 for supplying the line pressure into the front clutch servo 64 whereby the power transmission is shifted into the lowest gear reduction ratio or the direct drive and creep of the motor vehicle is prevented as already mentioned hereinabove.

Figure 4:
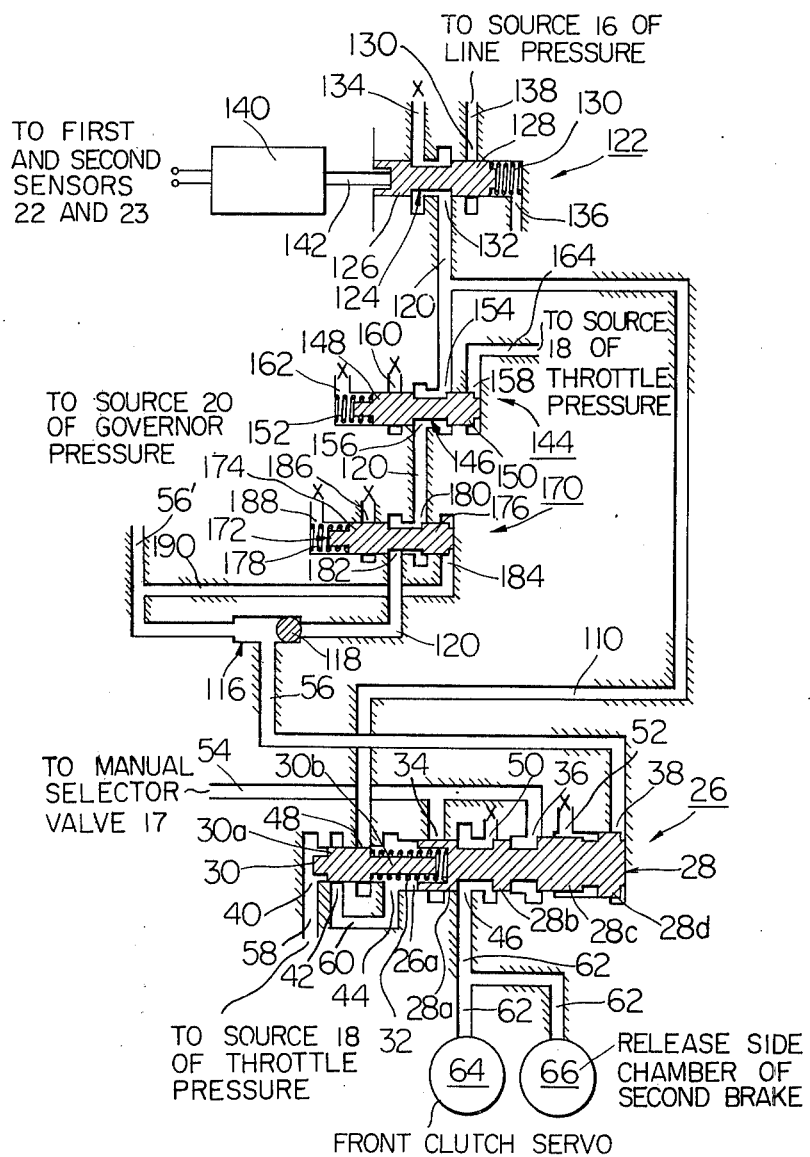
FIG. 4 is a sectional view of a third preferred embodiment of the hydraulic circuit shown in FIG. 1.

A third preferred embodiment of the hydraulic circuit forming part of the hydraulic system according to the present invention is illustrated in FIg. 4, wherein like or corresponding component parts are designated by the same reference numerals as those used in FIG. 3. This embodiment differs from that of FIG. 3 in that a fourth shift valve is interposed in the conduit 120 between the third shift valve 144 and the check valve 116. The fourth shift valve, which is generally designated by the reference numeral 170, comprises a slidable valve spool 172 having spaced valve lands 174 and 176, and a compression spring 178 for biasing the valve spool 172 rightwardly of the drawing, viz., toward a position to open the conduit 120. The fourth shift valve 170 has a plurality of por ports 180, 182, 184, 186 and 188. The port 180 communicates through the conduit 120 with the third shift valve 144. The port 182 communicates through the conduit 120 with the check valve 116. The port 184 communicates through a conduit 190 with the conduit 56' communicating with the source 20 of governor pressure and, thus, receives a governor pressure therefrom. The valve land 176 of the valve spool 172 is exposed to the governor pressure in the port 184 and, accordingly, the position of the valve spool 172 is determined by the value of the governor pressure acting on the valve land 176. With this arrangement, if the governor pressure reaches a predetermined level, the force acting on the valve land 176 of the valve spool 172 developed by the governor pressure overcomes the opposing force of the compression spring 178 so that the valve spool 172 is moved to a position to close the conduit 120.

The hydraulic circuit shown in FIg. 4 operates in a manner similar to that of FIG. 3 during kickdown operation and during idling of the vehicle engine. If, however, the accelerator pedal is released when the motor vehicle is running at a speed beyond a predetermined value, the valve spool 172 of the fourth shift valve 170 is moved to the position to interrupt fluid communication between the ports 180 and 182 by the action of the governor pressure in the port 184. In this condition, the line pressure is prevented from being supplied into the conduit 120 between the check valve 116 and the fourth shift valve 170 and, consequently, the check ball 118 of the check valve 116 assumes the position to provide fluid communication between the conduits 56 and 56'. Thus, the governor pressure is supplied into the governor pressure port 38 of the first shift valve 26 even in the event that the accelerator pedal is released when the motor vehicle is running at a speed beyond the predetermined value and, therefore, it is possible to obtain engine braking action in such a condition.

A fourth preferred embodiment of the hydraulic circuit forming part of the hydraulic system according to the present invention is illustrated in FIG. 5, wherein like or corresponding component parts are designated by the same reference numerals as those used in FIG. 3. This embodiment differs from that of FIG. 3 in that the conduit 110 is dispensed with and in that a fourth valve 200 is provided in the hydraulic circuit which fourth valve serves as an amplifier valve as will be subsequently described. The amplifier valve 200 comprises a slidable valve spool 202 having spaced valve lands 204 and 206, and a compression spring 208 for biasing the valve spool 202 upwardly of the drawing. The amplifier valve 200 has first and second inlet ports 210 and 212, and an outlet port 214. The amplifier valve 200 also has first and second control pressure ports 216 and 218. The fluid communication between the first inlet port 210 and the outlet port 214 is controlled by the valve land 204 of the valve spool 202, while the fluid communication between the second inlet port 212 and the outlet port 214 is controlled by the valve land 206 of the valve spool 202. The first inlet port 210 communicates through a conduit 220 with the source 20 of governor pressure to receive a governor pressure therefrom. The second inlet port 212 communicates with a conduit 222, which in turn communicates with the conduit 138 communicating with the source 16 of line pressure so that the line pressure is supplied into the second inlet port 212. The outlet port 214 communicates with a conduit 224, which in turn communicates with the check valve 116. The first control pressure port 216, which has an orifice 216a therein, communicates with the conduit 220 to receive the governor pressure. The governor pressure in the port 216 acts on the valve land 204 of the valve spool 212, thereby biasing the same downwardly of the drawing. The second control pressure port 218 communicates with a conduit 226, which in turn communicates with the conduit 120 between the second and third shift valves 122 and 144 so that, when the actuating device 140 is energized, the line pressure in the conduit 138 is admitted through the conduit 226 to the second control pressure port 218.

During normal driving condition of the motor vehicle, the actuating device 140 of the second shift valve 122 is de-energized so that the plunger 142 is caused to retracted. In this condition, the valve spool 124 is moved in a position as shown in FIG. 5 thereby interrupting fluid communication between the ports 130 and 132 while establishing fluid communication between the ports 132 and 134. Thus, the pressure in the conduit 226 is at zero level. Under these circumstances, the force acting on the valve land 204 of the valve spool 202 of the amplifier valve 200 developed by the governor pressure overcomes the opposing force of the compression spring 208 and, therefore, the valve spool 202 is moved to a position to provided fluid communication between the second inlet port 212 and the outlet port 214. Accordingly, a fluid pressure which is higher than the governor pressure exists in a fluid chamber 200a of the amplifier valve 200. This fluid pressure is varied in proportion to the level of the governor pressure. The fluid pressure in the fluid chamber 200a is then delivered through the conduit 224, the check valve 116 and the conduit 56 into the governor pressure port 38 of the first shift valve 26 and acts on the primary valve spool 28. Consequently, the primary valve spool 28 is moved between two positions in accordance with the throttle pressure and the fluid pressure acting thereon and, thus, the shifting will take place in the power transmission as functions of these two parameters.

During kickdown operation, the actuating device 140 of the second shift valve 122 is energized so that the drain 134 is closed by the valve land 126 while the port 130 is brought into fluid communication with the port 132. In this condition, the line pressure in the conduit 138 is fed through the ports 130 and 132 into the conduit 120. Since, on the other hand, the throttle pressure delivered to the port 158 of the third shift valve is at a high level during kickdown operation, the valve spool 146 is moved against the action of the compression spring 152 to a position to provide fluid communication between the ports 160 and 156 and to interrupt fluid communication between the ports 154 and 156. Under these circumstances, the line pressure in the conduit 120 is fed through the conduit 226 to the port 218 of the fourth valve means 200. The line pressure thus admitted to the port 218 acts on the valve land 206 of the valve spool 202 so that the valve spool 202 is moved against the opposing force acting on the valve land 204 developed by the governor pressure upwardly of the drawing, viz., toward a position to provide fluid communication between the ports 210 and 214. Consequently, the governor pressure in the port 210 is admitted to the fluid chamber 200a. The governor pressure in the fluid chamber 200a is passed through the port 214 to the conduit 224. The governor pressure thus delivered to the conduit 224 acts on the ball 118 of the check valve 116 and, therefore, the conduit 224 is brought into fluid communication with the conduit 56. Governor pressure is thus admitted to the governor pressure port 38 of the first shift valve 26 and acts on the primary valve spool 28. Since, in this instance, the flow of governor pressure through the port 210 is restricted by position of the peripheral edge of the valve land 204 of the valve spool 202, the governor pressure level admitted to the fluid chamber 200a is lower than that which has been described in connection with the embodiment of FIG. 4. Accordingly, the force developed by the governor pressure acting on the valve land 28d of the primary valve spool 28 of the first shift valve 26 is lower than that developed by the governor pressure utilized in the embodiment of FIG. 4. It will thus be seen that, in the embodiment of FIG. 5, the primary valve spool 28 is shifted when the vehicle speed reaches a higher level and accordingly the governor pressure increases to a higher level which corresponds to the level of the governor pressure applied to the primary valve spool 28 of the first shift valve 26 in the embodiment of FIG. 4. In other words, during kickdown operation the primary valve spool 28 of the first shift valve 26 is subjected to a hydraulic pressure which is lower than that acting thereon during normal driving condition of the motor vehicle and, therefore, line pressure is not supplied into the front clutch servo 64 and the release side chamber 66 of the second brake until the vehicle speed reaches the higher level. Thus, the kickdown operation is satisfactorily obtained.

If the accelerator pedal is released when the motor vehicle comes to a halt, the actuating device 140 of the second shift valve 122 is energized. In this condition, the line pressure is admitted to the conduit 120 and the governor pressure is admitted to the conduit 224 in a manner as already mentioned hereinabove. Since, however, the throttle pressure supplied to the port 158 of the third shift valve is at low level because the intake manifold vacuum is high when the accelerator pedal is released, the valve spool 146 is moved to a position to close the drain 160 while providing fluid communication between the ports 154 and 156 thereby admitting the line pressure to the conduit 120 between the third shift valve 144 and the check valve 116. Thus, the check ball 118, is subjected to the line pressure and the governor pressure. In this condition, the line pressure is higher than the governor pressure and, accordingly, the ball 118 is moved to a position to provide fluid communication between the conduits 120 and 56. The line pressure is thus admitted to the governor pressure port 38 of the first shift valve 26 so that the primary valve spool 28 of the first shift valve 26 is moved to the position to supply the line pressure to the front clutch servo 64 and the release side chamber 66 of the second brake thereby effecting upshift from higher gear reduction ratio to a lower gear reduction ratio in the power transmission.

It will now be understood from the foregoing description that the hydraulic system of the present invention is provided with an actuating device or solenoid cooperating with a shift valve and an accelerator pedal position sensor adapted to energize the actuating device when the accelerator pedal is released which actuating device actuates the shift valve cooperating therewith so as to supply a line pressure into a governor pressure port of a main shift valve thereby to cause the main shift valve to supply the line pressure to friction elements to effect upshifting from a higher gear reduction ratio to a lower gear reduction ratio in a power transmission whereby creep of a motor vehicle is prevented when the motor vehicle comes to a complete halt.

It should also be noted that the hydraulic system according to the present invention is provided with a second shift valve adapted to operate in dependent on a throttle pressure by which shiftdown is effected in the power transmission during kickdown operation.

It should further be noted that the hydraulic system of the present invention is also provided with a third shift valve adapted to operate in dependent on the governor pressure whereby upshifting from one gear reduction ratio to another is prevented in the power transmission even when the accelerator pedal is released during driving condition of the motor vehicle and, thus, engine braking action will be obtained when the motor vehicle is coasting downhill.

What is claimed is:

1. A hydraulic system for an automatic power transmission of a motor vehicle having an accelerator pedal, which power transmission has at least one servo means to actuate friction elements of the power transmission to effect shift from one gear reduction ratio to another, said hydraulic system comprising, in combination, a source of line pressure, a source of throttle pressure, a source of governor pressure, a first shift valve disposed between said source of line pressure and said servo means and including a valve spool movable between two extreme positions to control fluid communication between said source of line pressure and said servo means, said first shift valve having a throttle pressure port and a governor pressure port, said throttle pressure acting on said valve spool at one end thereof to move the same toward a position to effect downshifting, said governor pressure acting on said valve spool at the other end thereof to move the same toward another position to effect upshifting, first conduit means interconnecting said throttle pressure port with said source of throttle pressure, second conduit means interconnecting said governor pressure port with said source of governor pressure, third conduit means hydraulically connected to said source of line pressure and communicable with said second conduit means, a check valve disposed between said second conduit means and said third conduit means and having a floating ball normally assuming a position to admit governor pressure into said governor pressure port of said first shift valve through said second conduit means, sensing means responsive to a released condition of the accelerator pedal and generating an electrical signal indicative thereof, and a second shift valve disposed in said third conduit means and communicating with said source of line pressure and including a valve spool normally held in position to close said third conduit means, said second shift valve also including an electrical actuating means cooperating with the valve spool of said second shift valve, said electrical actuating means being responsive to said electrical signal for moving said valve spool of said second shift valve to a position to open said third conduit means for thereby admitting line pressure into said third conduit means to cause the floating ball of said check valve to move to a position to prevent supply of governor pressure into said second port of said first shift valve while permitting flow of line pressure thereinto, whereby the valve spool of said first shift valve is exposed to said throttle presssure and said line pressure which is higher than said governor pressure and assumes one of said two extreme positions in dependence on the values of said throttle pressure and said line pressure thereby to cause said power transmission to effect shift into a lower gear reduction ratio from said one gear reduction ratio to prevent creep of the motor vehicle when the accelerator pedal is released.

2. A hydraulic system for an automatic power transmission of a motor vehicle having an accelerator pedal, which power transmission has servo means to actuate friction elements of the power transmission to effect shift from one gear reduction ratio to another, said hydraulic system comprising, in combination, a source of line pressure, a source of throttle pressure, a source of governor pressure, a first shift valve disposed between said source of line pressure and said servo means and having a first port communicating with said source of throttle pressure and a second port communicating with said source of governor pressure, said first shift valve including a valve spool exposed to throttle pressure in said first port and governor pressure in said second port, said throttle pressure acting on said valve spool at one end thereof to move the same toward a position to effect downshifting, said governor pressure acting on said valve spool at the other end thereof to move the same toward another position to effect upshifting, first conduits means interconnecting said source of throttle pressure with said first port, second conduit means interconnecting said source of governor pressure with said second port, third conduit means hydraulically connected to said source of line pressure and communicable with said second conduit means, said first shift valve including a valve spool having first valve land exposed to throttle pressure in said first port and a second valve land exposed to governor pressure in said second port, fourth conduit means interconnecting said third conduit means with said first shift valve so that, when line pressure is admitted to said fourth conduit means, the line pressure is applied onto the valve spool of said first shift valve to move the same toward a position to effect kickdown, a check valve disposed between said second and third conduit means and having a floating ball normally assuming a position to allow governor pressure into said second port through said second conduit means, a second shift valve disposed in said third conduit means and communicating with said source of line pressure, said second shift valve including a slidable valve spool normally held in a position to interrupt fluid communication with said source of line pressure and said third conduit means, a third shift valve disposed in said third conduit means at a position downstream of a junction between said third and fourth conduit means, said third shift valve including a slidable valve spool normally held in a position to open said third conduit means, said valve spool of said third shift valve being responsive to throttle pressure by which when the accelerator pedal is fully depressed the valve spool of said third shift valve is moved to a position to close said third conduit means, first sensing means responsive to a released condition of the accelerator pedal and generating an electrical signal indicative thereof, and second sensing means responsive to fully depressed condition of said accelerator pedal for generating an electrical kickdown signal indicative thereof, said second shift valve further including an electrical actuating device connected to said first and second sensing means, said electrical actuating device cooperating with the valve spool of said second shift valve and moving the same to a position to admit line pressure into said third conduit means in response to one of said electrical signals, whereby when the accelerator pedal is released, the line pressure is admitted to said second port of said frist shift valve through said second and third conduit means and the valve spool of said first shift valve is responsive to throttle pressure in said first port and line pressure admitted into said second port so that the valve spool of said first shift valve is caused to move to said another position to effect upshifting, whereas when the accelerator pedal is fully depressed the valve spool of said third shift valve is moved to a position to close said third conduit means, whereby line pressure admitted into said third conduit means between said second and third shift valves is delivered through said fourth conduit means into said first shift valve to cause downshifting.

3. A hydraulic system for an automatic power transmission of a motor vehicle having an accelerator pedal, which power transmission has servo means to actuate friction elements of the power transmission to effect shift from one gear reduction ratio to another, said hydraulic system comprising, in combination, a source of line pressure, a source of throttle pressure, a source of governor pressure, a first shift valve disposed between said source of line pressure and said servo means and having a throttle pressure port communicating with said source of throttle pressure port and a governor pressure port communicating with said source of governor pressure port, said throttle pressure acting on said valve spool at one end thereof to move the same toward a position to effect downshifting, said governor pressure acting on said valve spool at the other end thereof to move the same toward another position to effect upshifting, said first shift valve including a valve spool having a first valve land exposed to throttle pressure in said throttle pressure port and a second valve spool exposed to governor pressure in said governor pressure port, first conduit means interconnecting said throttle pressure port with said source of throttle pressure, second conduit means interconnecting said governor pressure port with said source of governor pressure, third conduit means hydraulically connected to said source of line pressure and communicable with said governor pressure port through said second conduit means, fourth conduit means interconnecting said third conduit means with first shift valve so that, when line pressure is admitted to said fourth conduit means, the line pressure is applied onto the valve spool of said first shift valve to move the same to a position to effect kickdown, a check valve disposed between said second and third conduit means and having a floating ball normally assuming a position to allow governor pressure into said governor pressure port through said second conduit means, a second shift valve disposed in said third conduit means, said second shift valve having an inlet communicating with said source of line pressure, an outlet communicating with said third conduit means, a slidable valve spool and a spring normally biasing the valve spool of said second shift valve in a position to interrupt fluid communication between said inlet and outlet, a third shift valve disposed in said third conduit means at a position downstream of a junction between said third and fourth conduit means, said third shift valve having an inlet communicating with the outlet of said second shift valve, an outlet communicating with said second conduit means through said check valve, a throttle pressure port communicating with said source of throttle pressure, a slidable valve spool and a spring normally biasing the valve spool of said third shift valve in a position to provide fluid communication between inlet and outlet of said third shift valve, the valve spool of said third shift valve being responsive to throttle pressure in said throttle pressure port of said third shift valve by which when the accelerator pedal is fully depressed the valve spool of said third shift valve is moved to a position to interrupt fluid communication between said inlet and outlet of said third shift valve, first sensing means responsive to a released condition of the accelerator pedal and generating an electrical signal indicative thereof, and second sensing means responsive to a fully depressed condition of said accelerator pedal and generating an electrical kickdown signal indicative thereof, said second shift valve including an electrical actuating device cooperating with the valve spool of said second shift valve, said electrical actuating device being responsive to one of said electrical signals to move the valve spool of said second shift valve to a position to provide fluid communication between said inlet and outlet of said second shift valve against the action of said spring thereof, whereby when the accelerator pedal is released the line pressure is admitted to said governor pressure port of said first shift valve through said second and third conduit means so that the valve spool of said first shift valve is caused to move to said another position to effect upshifting, whereas when the accelerator pedal is fully depressed line pressure in said third conduit means is delivered through said fourth conduit means into said first shift valve to cause downshifting.

4. A hydraulic system for an automatic power transmission of a motor vehicle having an accelerator pedal, which power transmission has at least one servo means to actuate friction elements of the power transmission to effect shift from one gear reduction ratio to another, said hydraulic system comprising, in combination, a source of line pressure, a source of throttle pressure, a source of governor pressure, a first shift valve disposed between said source of line pressure and said servo means and responsive to throttle pressure from said source of throttle pressure and governor pressure from said source of governor pressure to control fluid communication between said source of line pressure and said servo means, said first shift valve having a throttle pressure and a governor pressure port, first conduit means interconnecting said throttle pressure port with said source of throttle pressure, second conduit means interconnecting said governor pressure port with said source of governor pressure, third conduit means hydraulically connected to said source of line pressure and communicable with said second conduit means, sensing means responsive to a released condition of the accelerator pedal and generating a signal indicative thereof, and a second shift valve disposed in said third conduit means and communicating with said source of line pressure, said second shift valve including a valve spool normally held in position to close said third conduit means and an actuating means cooperating with the valve spool of said second shift valve, said actuating means being responsive to said signal for moving the valve spool of said second shift valve to a position to open said third conduit means for thereby admitting line pressure to said third conduit means through which the line pressure is passed to said governor pressure port of said first shift valve, whereby said first shift valve is responsive to said throttle pressure and said line pressure which is higher than said governor pressure and operative to shift the flow of said line pressure being supplied to said servo means in dependence on the instantaneous values of said throttle pressure and said line pressure to cause said power transmission to shift into a lower gear reduction ratio from said one gear reduction ratio to prevent creep of the motor vehicle when the accelerator pedal is released.

5. A hydraulic system according to claim 4, further comprising a manual selector valve which is disposed between said source of line pressure and said first shift valve for delivering said line pressure to said first shift valve when said manual selector valve is set in its automatic drive position.

6. A hydraulic system according to claim 5, in which said first shift valve has an inlet port communicating with said source of line pressure through said manual selector valve, an outlet port communicating with said servo means, a valve spool having one end exposed to said throttle pressure in said throttle pressure port and another end exposed to said governor pressure in said governor pressure port, said another end of said valve spool being selectively exposed to said line pressure when said line pressure is admitted to said governor pressure port, and said valve spool being movable between two extreme positions to control fluid communication between said inlet and said outlet ports.

7. A hydraulic system according to claim 4, in which said second shift valve has a first port communicating with said source of line pressure, a second port communicating with said third conduit means, and biasing means for urging said valve spool of said second shift valve toward a position to normally interrupt fluid communication between said first and second ports, the valve spool of said second shift valve being movable to another position to provide fluid communication between said first and second ports for admitting line pressure to said third conduit means in response to said signal from said sensing means.

8. A hydraulic system according to claim 7, further comprising sensing means responsive to a fully depressed condition of the accelerator pedal for generating a kickdown signal indicative thereof, and in which said actuating means is also responsive to said kickdown signal for moving the valve spool of said second shift valve to said another position to provide fluid communication between said first and second ports for thereby admitting line pressure into the throttle pressure port of said first shift valve to effect kickdown in said power transmission.

9. A hydraulic system according to claim 4, further comprising valve means disposed between said second conduit means and said third conduit means, said valve means normally opening said second conduit means to admit governor pressure to the governor pressure port of said first shift valve while closing said third conduit means, and said valve means being operative to open said third conduit means thereby to admit line pressure to the governor pressure port of said first shift valve when the governor pressure is admitted to said third conduit means while simultaneously closing said second conduit means to prevent the supply of governor pressure into the governor pressure port of said first shift valve.

10. A hydraulic system according to claim 9, in which said valve means comprises a floating ball normally assuming a position to admit governor pressure to the governor pressure port of said first shift valve.

11. A hydraulic system according to claim 9, further comprising a third shift valve disposed in said third conduit means between said second shift valve and said valve means, said third shift valve including a valve spool normally held in a position to open said third conduit means and responsive to throttle pressure from said source of throttle pressure whereby when said accelerator pedal is fully depressed and said throttle pressure reaches a predetermined level the valve spool of said third shift valve is moved toward another position to close said third conduit means for thereby admitting line pressure to said throttle pressure port of said first shift valve.

12. A hydraulic system according to claim 11, in which said third shift valve has first and second ports communicating with said third conduit means and a third port communicating with said source of throttle pressure.

* * * * *